United States Patent [19]

Heule

[11] Patent Number: 5,209,617
[45] Date of Patent: May 11, 1993

[54] DEBURRING TOOL

[76] Inventor: Heinrich Heule, Kristallstrasse 6, Au, Switzerland, 9434

[21] Appl. No.: 798,657

[22] Filed: Nov. 26, 1991

[30] Foreign Application Priority Data

Nov. 27, 1990 [DE] Fed. Rep. of Germany ....... 4037649

[51] Int. Cl.⁵ .............................................. B23B 51/00
[52] U.S. Cl. .................................... 408/178; 408/154; 408/173
[58] Field of Search ....................... 408/147, 153–157, 408/173, 178

[56] References Cited

U.S. PATENT DOCUMENTS

| 4,140,432 | 2/1979 | Heule | 408/154 |
| 4,660,262 | 4/1987 | Heule | 408/157 X |
| 4,756,649 | 7/1988 | Heule | 408/157 X |

Primary Examiner—Steven C. Bishop
Attorney, Agent, or Firm—Brown, Martin, Haller & McClain

[57] ABSTRACT

Described is a deburring tool with a knife housing extended downward and with a smaller diameter making it possible to debur even smaller bores on the front and rear.

5 Claims, 2 Drawing Sheets

DEBURRING TOOL

BACKGROUND OF THE INVENTION

The invention concerns a deburring tool with an elongated housing accommodating a rotatable intermediate body on whose upper end is a torsion spring and which features pins at its lower end which engage knives in recesses which can be moved in guideways in the tool housing essentially in a radial direction of the tool against the spring tension.

Such a deburring tool is described in German patent 26 49 208. The housing and intermediate body are relatively short and have a diameter which remains constant over its length so that bores below a given diameter cannot be deburred with this tool. The intermediate body is held in the housing so that its height can be adjusted. In addition, the angle of rotation is limited by a screw adjustable from the outside which engages a center piece of the intermediate body.

SUMMARY OF THE INVENTION

Compared to the current state of the art, the task of the invention in particular is to design the known deburring tool so that even bores with a significantly reduced diameter can be deburred effectively. In addition, the deburring tool should be characterized by improved ease of operation and extended life.

To solve this task the invention features a housing whose lower end has a reduced diameter compared to its upper part in the area of the upper end of the intermediate body, and an intermediate body which features a guide shaft at its lower knife-side end and a cover plate at its upper end.

These features constitute a significant extension of the deburring tool towards the bottom in the direction of the knife and provide a significantly reduced diameter thus resolving the task of the invention. In the vicinity of the knives is the guide shaft of the intermediate body which serves to guide the sleeve in the housing.

In order to solve the task of the invention it is recommended that the height of the intermediate body in the housing can be adjusted so that knives can be readily exchanged, for example for deburring bores with other diameters. In order to achieve this it is preferred that a cam which can be activated from the outside applies to a collar of the intermediate body.

In order to limit the angle of rotation of the intermediate body it is recommended that the intermediate body features at least one pin to which applies a screw which can be adjusted in the housing.

An important design feature of the invention is the fact that the housing is secured to a shaft and can easily be exchanged whereby a setscrew activated from the outside engages a free position of the intermediate body. This enables the intermediate body with housing to be exchanged in a simple manner for another unit with intermediate body and housing with a different length and/or a different diameter.

On its opposite side, the intermediate body is arranged in the main body so that it can be rotated in the area of a cover plate, which applies to the inside of a central recess in the main body.

Another feature of the present invention is that the rotation of the intermediate body can be set and precisely repeated by means of a pressure point screw arranged in a radial bore of the main body and whose pin-side end is supported by a catch of the rocker.

Depending upon whether the pressure point screw is screwed in or out, this determines the rotation of the intermediate body and accurately defines the desired perpendicular diameter of the knives or bevel size of the knives. In other words, setting the pressure point screw makes it possible to precisely set and repeat the perpendicular diameter whereby the knives during deburring drive into the bore with the set perpendicular diameter and when passing through the bore are spring-loaded and pressed into the guide recess of the knife housing. As soon as the perpendicular tool has passed through the bore, the spring-loaded knives reemerge from the bore and with their back side debur the rear bore edge, whereby once again the pressure point screw precisely defines the desired perpendicular diameter so that it can be repeated.

Another important feature of the present invention is that the intermediate body is arranged in the central longitudinal bore of the main body and in the knife housing of the perpendicular tool so that its height can be adjusted. Purpose of the height adjustment is to provide for easy exchange of the deburring knives. As mentioned already, the intermediate body features two parallel pins whereby each pin is assigned to a deburring knife and controls the radial shift of this deburring knife in the guide recess of the knife housing. In order to provide for the ready exchange of the knives, the entire rocker is designed with adjustable height so that with the height adjustment of the intermediate body the pins engaged in the deburring knives can be disengaged and so that the deburring knives can be readily removed from the guide recess in the knife housing.

In a preferred embodiment of the present invention, height adjustment of the intermediate body takes place through a cam displacement.

One lug of the rotatable cam is supported by a collar of the intermediate body and rotation of the cam is set by means of a fixing screw.

In other words, in one rotational position of the cam, the lower face-side pins of the intermediate body engage the deburring knives, and in the other rotational position of the cam, these pins become disengaged (due to the height adjustment of the intermediate body) from the assigned recesses in the knives, thus enabling the knives to be easily exchanged.

As known already, rotation of the intermediate body is controlled by a torsion spring so that the knives are spring-loaded under the effect of this torsion spring when driven into the guide recess of the knife housing when entering a through-hole.

The use of this torsion spring for the previously described height adjustment in accordance with the invention offers the advantage that this spring-loaded torsion spring at the same time also prestresses the intermediate body in the direction of the deburring knives. This means that the pins on the intermediate body, which engage the deburring knives, are pressed into these deburring knives due to the load of the spring. This means that at all times pressure of the torsion spring maintains the cam in its position which corresponds to the lowered position of the intermediate body (operating position). Only by using a tool applied to the cam can the cam be moved against this spring tension.

The following is a more detailed description of one variant of the invention. The variant and its description reveal further characteristics and advantages.

DESCRIPTION OF THE PREFERRED EMBODIMENT

Figure 2:
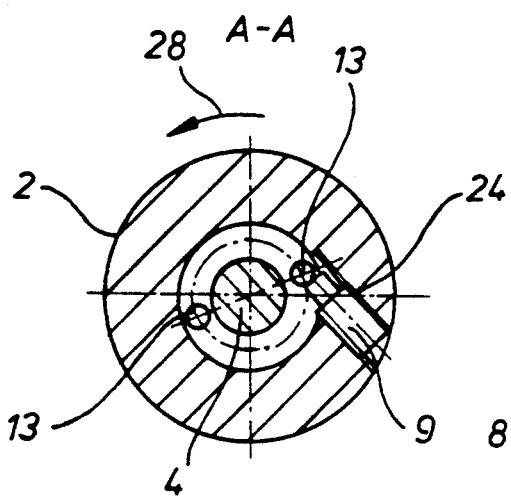
FIG. 2 shows a cross-section of the perpendicular tool along line A—A.
Figure 3:
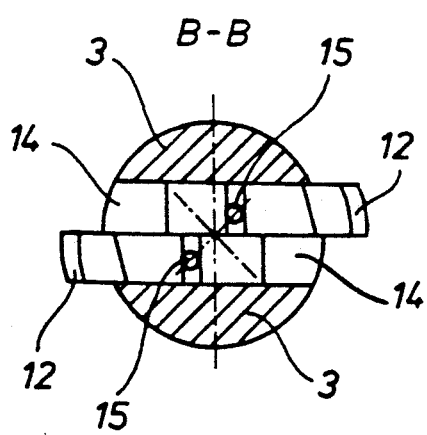
FIG. 3 shows a cross-section of the perpendicular tool along line B—B.
Figure 1:
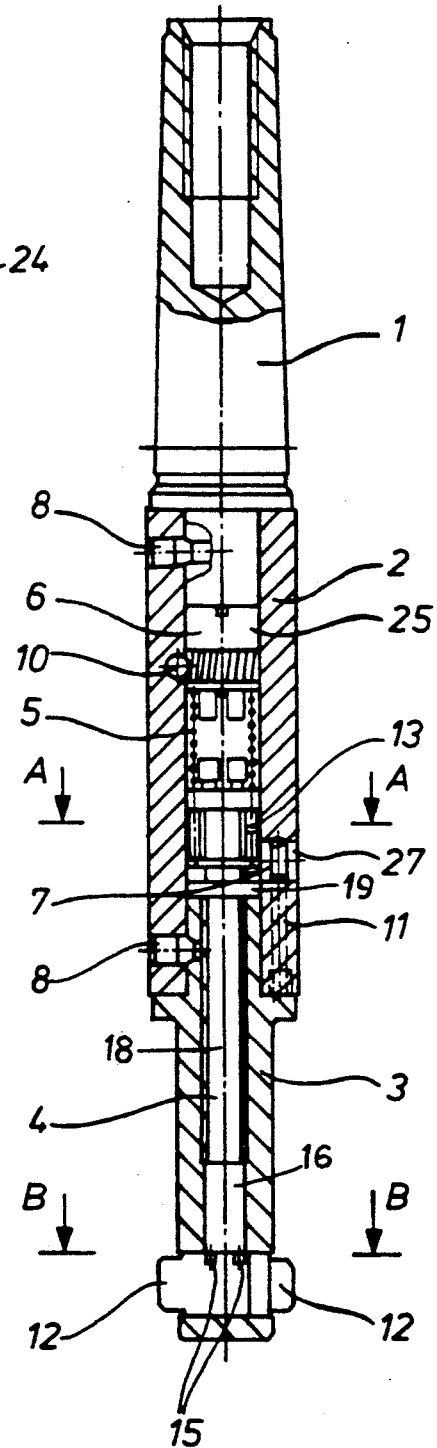
FIG. 1 shows a diagram of a perpendicular tool in accordance with the invention.

Essentially, the perpendicular tool in accordance with the illustrated embodiment comprises an elongated housing having an upper end portion or main body 2 with an axial bore or recess 25, and a separate lower end portion or knife housing 3 also having an axial bore. Shaft 1 engages in bore or recess 25 at the upper end of body 2 and is connected to the body 2 with a set screw 8, as illustrated in FIG. 1. A pair of deburring knives or blades 12 are slidably located in a transverse guide slot or recess 14 in the lower end of knife housing 3, as best illustrated in FIGS. 2 and 3.

The shaft serves to secure the deburring or perpendicular tool in a machine.

In other words, it is of significant advantage that the shaft is readily exchanged and is maintained in the main body 2 by means of a setscrew 8. Specifically, this offers the advantage that various shafts can be readily loosened from the main body. For example, shafts in the weldon version can be used, or set sleeves, or shafts with drive protection, and such.

The main body 2 is extended downward in the direction of the deburring knife 12 by means of the knife housing 3 with a diameter which is smaller than that of the main body. This makes it possible to debur even the smallest of deburring diameters such as minimum deburring diameters of 4 mm or less.

Inside the main body 2 and the knife housing is a rotatable intermediate body or rocker 4 which is also height adjustable. The intermediate member or rocker 4 is illustrated in more detail in FIG. 4. Intermediate member 4 basically comprises an elongate shaft having spaced upper and lower end portions which are rotatably supported in the respective portions of the axial bore in housing parts 2 and 3. A reduced diameter portion 17, 18 extends between the lower end portion 16 and upper end portion. The lower end portion 16 comprises a guide shaft and has a pair of pins 15 projecting from its end face for engagement in recesses in the respective deburring knives, as illustrated in FIG. 3. Thus, rotation of member 4 controls the displacement of the deburring knives in guide recesses 14.

It is important that the knives 12 are arranged on the face side of the guide shaft 16 which serves as rotatable support for the intermediate body in the knife housing 3. In other words, the guide shaft 16 serves as a rotatable support of the extended intermediate body 4 in the knife housing 3. This offers the advantage that it ensures an optimum support of the intermediate body 4 via the guide shaft 16 in the area of the knife housing 3, and that this support is as close as possible to the deburring knives 12.

As a result, the entire tool becomes stable and the knives become virtually play-free in their guide recess 14.

On the other side of the guide shaft portion 16 is a shaft 17 of a lesser diameter which is spaced from the inside bore in the knife housing 3 in order to make certain that the support of this guide rocker 4 takes place only in the area of the guide shaft 16.

Connected to the shaft portion 17 is a reduced diameter portion 18 defining an annular space in which is installed the setscrew 8 across in the main body. Task of this setscrew 8 is to tighten the knife housing 3 in the main body 2 so that it can be detached but not rotated. This offers the significant advantage that the knife housing is readily exchangeable in the main body and that as a result the intermediate body 4 is also easily exchangeable in the main body.

This offers the significant advantage that even very long through-holes can easily be deburred because the knife housing 3 and the corresponding rocker are simply exchanged for longer parts. The result is a modular design of the perpendicular tool which can be used universally for through-holes of different lengths.

In other words, the reduced diameter portion 18 serves to make certain that the setscrew 8 in this area does not collide with the intermediate body 4.

Extending from shaft portion 18 is the upper end portion of intermediate member 4. The upper end portion 18 includes a cover plate 19 and a collar 22 spaced from cover plate 19 by reduced diameter portion 22. Cover plate 19 is a close fit in bore 25 and is rotatably supported in the bore 25 to serve as the support or bearing of the intermediate body in the central recess 25 in the main body 2. At the same time, this bearing makes certain that the central recess in the knife housing is sealed relative to the mechanics of the rocker. The mechanics of the rocker are arranged above the cover plate 19, and the cover plate 19 is for the purpose of mounting.

The reduced diameter portion 20 between plate 19 and collar 22 defines an annular space intended for gearing a cam 7 which serves to adjust the height of the rocker 4. The cam 7 is shown in FIG. 4 and can also be viewed in FIG. 1.

When the cam is turned 180° by using a tool that is introduced into its recess 26, the lug 21 applies to the bottom of the collar 22 and as a result raises the entire rocker whereby the pins 15 disengage from the assigned recesses of the deburring knives 12. As a result, the deburring knives can be easily removed radially from their guide recesses 14 and replaced by other deburring knives.

Purpose of a setscrew 11 is to prevent the cam 7 from dropping radially out of the cross bore 27.

Figure 4:
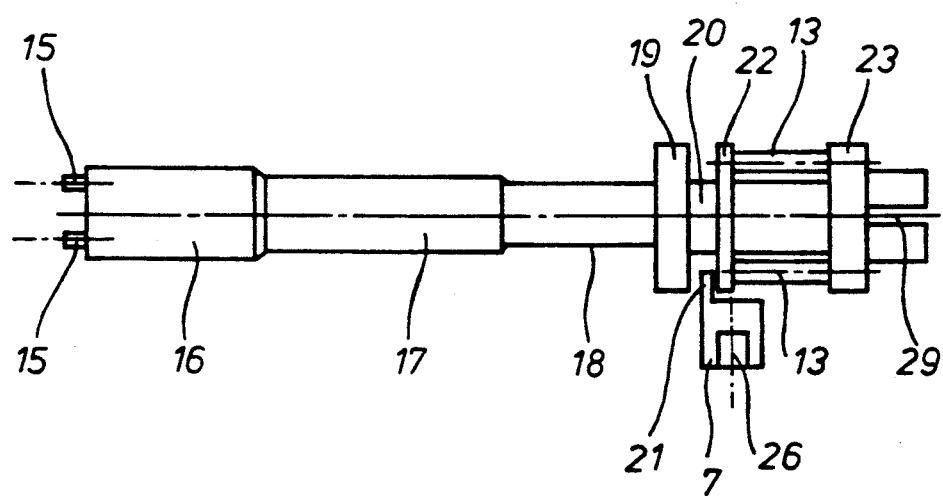
FIG. 4 is a lateral view of an intermediate body in accordance with the invention on an enlarged scale.

Spaced pins 13 project from collar 22 as best illustrated in FIGS. 2 and 4. Pines 13 act as rotation stops for the rotation drive of intermediate member 4.

In accordance with FIG. 2 a pressure point screw 9 secured in a radial bore 24 in the main body 2 serves to set the rotation of the rocker 4. The pin-side end of this pressure point screw 9 applies to the single pin 13. This setting makes it possible to adjust precisely and to repeat the radial displacement of the knives. As soon as the knives drive through a through-hole, the rocker turns in the direction of the arrow 28 against the force of a torsion spring 5 which with its one end applies to the rocker in a slit 29 and with its other end to a cocking lever 6 which can be rotated via a tightening screw 10. With its pin-side coil the tightening screw 10 engages an external thread of the cocking lever 6 designed as a pinion. As a result, the spring tension of the torsion spring can be set in a continuous manner by turning the tightening screw.

As described earlier, the torsion spring 5 also presses the height-adjustable rocker 4 with its pin 25 into the assigned recesses of the deburring knives 12 under the force of this torsion spring.

In addition, the spring with its spring binding rests on the collar 23.

In other words, the deburring tool described above offers the significant advantage that the perpendicular diameter of the knives 12 can be set precisely with the pressure point screw 9 so that an accurately reproducible phase is reachable when deburring. In addition, there is also the advantage that the knife can also be driven into long through-holes due to the extended guide rocker and the extended knife housing and that small through-holes can also be deburred. There is also the advantage that the rocker and knife housing are readily exchangeable in order to be able to debur long through-holes.

In other words, the main features of the present invention are the nature and design of the rocker, which is height- adjustable, extended downward and can be rotated in the knife housing 3 through the guide shaft 16 and can be set exactly through the pressure point screw.

I claim:

1. A deburring tool comprising:
   an elongated housing having an upper end portion and a lower end portion of diameter less than said upper end portion;
   the housing having an axial through bore and a transverse guide slot in the lower end portion of the housing;
   a pair of cutter members slidably supported in said guide slot for movement between a retracted position and an extended position projecting radially outwardly from said housing, each cutter member having an upwardly directed recess;
   an elongated intermediate member rotatably mounted in said axial bore, said intermediate member having spaced upper and lower portions rotatably supported in said bore and a reduced diameter portion extending between said upper and lower portions;
   torsion spring means in the upper portion of said housing for engagement with the upper end portion of said intermediate member; and
   said lower portion having pins projecting form its lower end for engagement in respective recesses in said cutter members,
   whereby said cutter members are moved inwardly and outwardly by rotation of said intermediate member in opposite directions.

2. The tool as claimed in claim 1, wherein said intermediate member includes a collar of larger diameter than adjacent portions of said intermediate member, and cam means for engaging said collar to adjust the height of said intermediate member in said housing, said cam means including externally operable actuator means for operating said cam means.

3. The tool as claimed in claim 1, wherein said intermediate member includes at least one pin extending parallel to the axis of said bore, said housing having a radially bore located adjacent said pin, and an adjustable stop member extending through said radial bore for engagement with said pin to limit rotation of said intermediate member in said bore.

4. The tool as claimed in claim 1, wherein said upper and lower end portions of said housing are formed as two separate housing parts each having an axial bore, the parts being releasably secured together.

5. The tool as claimed in claim 4, wherein one of said parts has a reduced diameter portion for telescopic engagement in the adjacent end of the axial bore in the other part, and further including releasable securing means connecting said reduced diameter portion of said part to the other part, the reduced diameter portion of said intermediate member being located at the connection between said parts to define a free spaced between said intermediate member and the surface of said axial bore for receiving said securing means.

* * * * *